(12) United States Patent
Skarve et al.

(10) Patent No.: US 9,402,200 B2
(45) Date of Patent: Jul. 26, 2016

(54) FLOW BASED PACKET MANIPULATION CONGESTION CONTROL

(75) Inventors: Martin Skarve, Enebyberg (SE); Erik Geijer Lundin, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 138 days.

(21) Appl. No.: 14/356,200

(22) PCT Filed: Nov. 29, 2011

(86) PCT No.: PCT/SE2011/051448
§ 371 (c)(1),
(2), (4) Date: May 5, 2014

(87) PCT Pub. No.: WO2013/081511
PCT Pub. Date: Jun. 6, 2013

(65) Prior Publication Data
US 2014/0307547 A1    Oct. 16, 2014

(51) Int. Cl.
*G01R 31/08* (2006.01)
*H04W 28/02* (2009.01)
*H04L 12/801* (2013.01)
*H04L 12/851* (2013.01)
*H04L 12/833* (2013.01)
(Continued)

(52) U.S. Cl.
CPC ........... *H04W 28/0273* (2013.01); *H04L 47/11* (2013.01); *H04L 47/12* (2013.01); *H04L 47/2441* (2013.01); *H04L 47/31* (2013.01); *H04W 28/0205* (2013.01); *H04W 28/0247* (2013.01); *H04L 47/14* (2013.01); *H04L 47/19* (2013.01); *H04L 47/32* (2013.01); *H04W 80/06* (2013.01)

(58) Field of Classification Search
CPC ............... H04W 28/0273; H04W 28/0205; H04W 28/0247; H04L 47/11; H04L 47/12; H04L 47/2441; H04L 47/31; H94W 80/06
See application file for complete search history.

(56) References Cited

U.S. PATENT DOCUMENTS

| 6,785,237 B1 | 8/2004 | Sufleta | |
|---|---|---|---|
| 2004/0190449 A1* | 9/2004 | Mannal | H04L 47/10 370/229 |
| 2005/0076136 A1* | 4/2005 | Cho | H04L 29/06027 709/231 |

(Continued)

FOREIGN PATENT DOCUMENTS

| EP | 1271856 A1 | 1/2003 |
|---|---|---|
| EP | 1551136 A1 | 7/2005 |

(Continued)

OTHER PUBLICATIONS

Supplementary Search Report for European Patent Application No. 11876440.6, mailed Apr. 22, 2015, 3 pages.
(Continued)

*Primary Examiner* — Robert Wilson
(74) *Attorney, Agent, or Firm* — Withrow & Terranova, PLLC

(57) ABSTRACT

This disclosure relates to a Radio Network Controller, RNC, a base station, and to methods therein. By extracting information from one or more flows of Protocol Data Units, PDUs, which information is accessible on a certain protocol layer only, congestion control is enabled and performed on another protocol layer based on said information.
The present disclosure avoids that inappropriate PDUs are discarded, which else would inappropriately affect the user performance.

17 Claims, 4 Drawing Sheets

(51) Int. Cl.
*H04W 80/06* (2009.01)
*H04L 12/823* (2013.01)

(56) References Cited

U.S. PATENT DOCUMENTS

| | | | |
|---|---|---|---|
| 2006/0045011 A1 | 3/2006 | Aghvami et al. | |
| 2009/0041013 A1* | 2/2009 | Mitchell | H04L 12/14 370/392 |
| 2009/0067335 A1* | 3/2009 | Pelletier | H04L 41/5025 370/238 |
| 2014/0140234 A1* | 5/2014 | Briscoe | H04L 47/18 370/252 |
| 2014/0307547 A1* | 10/2014 | Skarve | H04L 47/11 370/230 |

FOREIGN PATENT DOCUMENTS

| | | |
|---|---|---|
| WO | 0056011 A2 | 9/2000 |
| WO | 03025709 A2 | 3/2003 |
| WO | 2004006486 A2 | 1/2004 |
| WO | 2011120581 A1 | 10/2011 |
| WO | 2012057667 A1 | 5/2012 |
| WO | 2013081511 A1 | 6/2013 |

OTHER PUBLICATIONS

Examination Report for European Patent Application No. 11876440.6, mailed Jun. 4, 2015, 6 pages.

Shames, Iman et al., "Application of Reinforcement Learning in Development of a New Adaptive Intelligent Traffic Shaper," Proceedings of the 5th International Conference on Machine Learning and Applications, IEEE Computer Society, Dec. 14, 2006, 5 pages.

Zhou, Xiaobo et al., "Hop-Count based Probabilistic Packet Dropping: Congestion Mitigation with Loss Differentiation," Computer Communications, vol. 30, Issue 18, Elsevier Science Publishers, Dec. 2007, 14 pages.

International Search Report and Written Opinion for PCT/SE2011/051448 mailed Dec. 6, 2012, 11 pages.

* cited by examiner

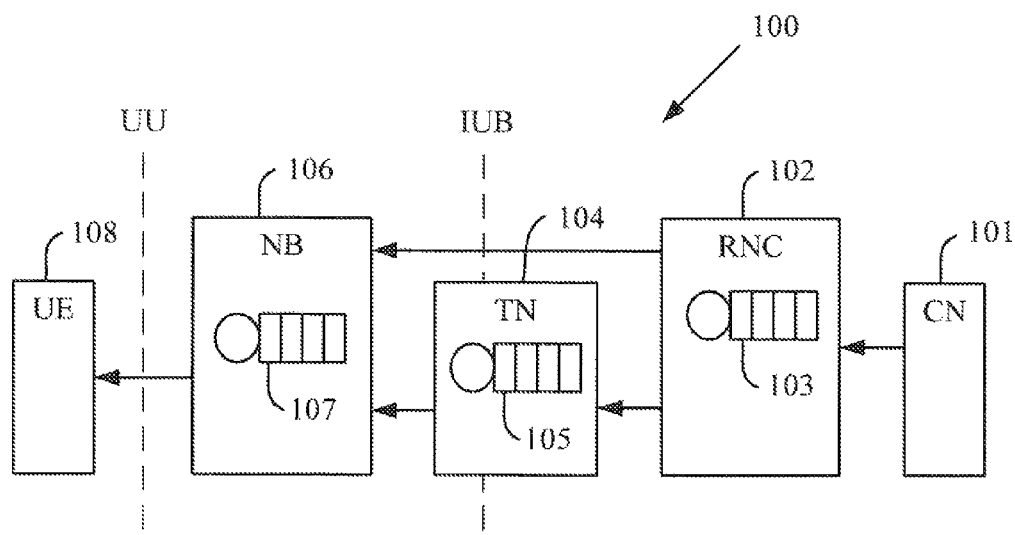
FIG. 1
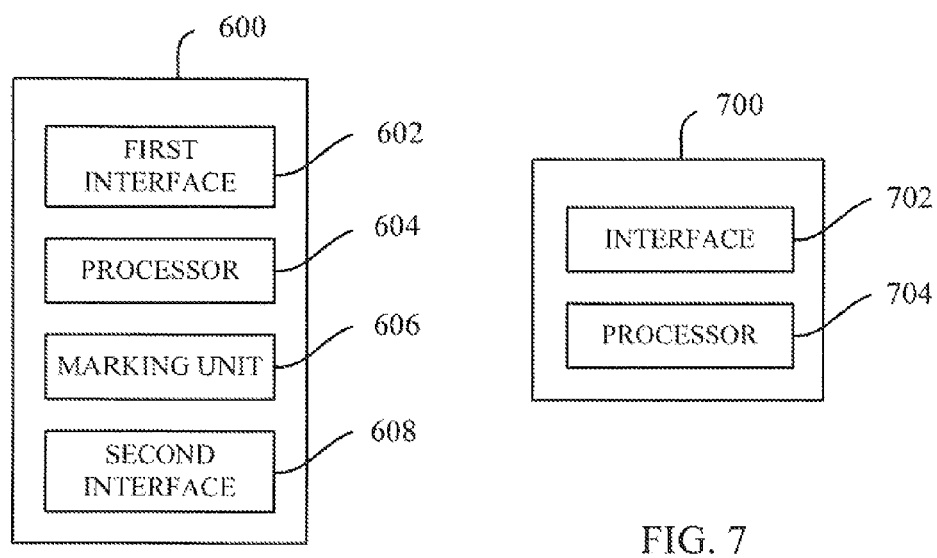
FIG. 6
FIG. 7

FLOW BASED PACKET MANIPULATION CONGESTION CONTROL

This application is a 35 U.S.C. §371 national phase filing of International Application No. PCT/SE2011/051448, filed Nov. 29, 2011, the disclosure of which is incorporated herein by reference in its entirety.

TECHNICAL FIELD

This disclosure pertains in general to the field of congestion control, and more particularly to methods and arrangements for flow based packet manipulation congestion control.

BACKGROUND

In a Wideband Code Division Multiple Access system, a Radio Access Network (RAN) normally comprises one Radio Network Controller (RNC) and one base station, such as a Radio Base Station, where the latter is responsible for transmitting data over the air interface. For best effort Quality of Service two different transport network congestion control algorithms are used to provide that user data is available in the base station for scheduling.

In a traditional algorithm the RNC shapes the traffic down to the base station in order to maintain the amount of user data in a user data buffer constant in time in the base station.

In a more recent algorithm the RNC does not shape the user data traffic and instead the RBS is in theory the only RAN node with a buffer for buffering of user data. The user data traffic volume in a base station buffer, as well as in buffer(s) in the Transport Network (TN) is typically controlled by introducing a packet discard functionality on user data. This is demonstrated in patent application WO2011120581A1.

The packet discard functionality being used therein operates on a per Radio Access Bearer (RAB) level. This means that the bit rate is measured per RAB and that any packet in the RAB is discarded when resolving a detected congestion.

Applying this packet discard functionality to the Transmission Control Protocol (TCP) operating per TCP flow, packet would be discarded per TCP flow. A packet would thus be discarded from the TCP flow in which congestion was detected.

The TCP response to a packet discard depends on characteristics of the TCP flow, such as TCP flow bit rate or recent discards on the same TCP flow.

Said packet discard functionality works conceptually well in a single service scenario with a single TCP flow, due to that an introduced packet discard always occurs on the only existing TCP flow and therefore reduces the rate of this flow, i.e. the requested behavior is achieved. In other words, there is a one-to-one mapping between RAB and the TCP flow.

In today's smartphone- and Personal Computer dongle-dense networks, a large extent of the users have multiple ongoing services as well as services with multiple TCP flows involving web browsers, Peer-to-Peer (P2P) traffic etc. This creates a scenario with multiple flows, within one Radio Access Bearer (RAB). Within such a scenario an Internet Protocol (IP) packet discard functionality according to the packet discard functionality, as mentioned above, may select and hit a packet belonging to any of the ongoing TCP flows within the RAB that experiences a detected congestion. However, if the flow within which the RAB is hit is an incorrect flow, i.e. for instance a flow that does not react to packet discards, that is associated with a high priority application or has a very low bit-rate, the effect will be that no or a very limited rate reduction within the RAB is achieved. This erroneous attempt to regulate the bit-rate will in turn result in a higher packet loss rate in the TN. The increased packet loss rate causes a reduced end user performance both at congestion in the TN and/or at the Uu interface, i.e. the air interface between the base station and a User Equipment served by said base station.

There is hence a need for an improvement of the congestion control in a communication network.

SUMMARY

An object of the present disclosure is to provide a congestion control with which correct flows of Protocol Data Units (PDUs) are affected in multi-flow scenarios.

This is attained by extracting information on a protocol layer in which flow information is accessible, enabling manipulating of PDUs on another protocol layer, on which said flow information else is inaccessible.

According to one aspect of this disclosure, a method in a first network node of a communication network, for marking of PDUs on a first protocol layer, is disclosed. The method comprises receiving PDUs of a flow on a second protocol layer, and extracting being information about said flow and storing said information being extracted. The method also comprises marking PDUs on the first protocol layer, where said first protocol layer PDUs being marked correspond to second protocol layer PDUs that are appropriate for manipulation based on said stored information. In addition, the method comprises sending PDUs on the first protocol layer that is a lower protocol layer than said second protocol layer.

The information about said flow, in the extracting information may comprise at least one of: a protocol or application type of the flow, a source IP address, a destination IP address, a source port and a destination port, which all are at least associated with the flow.

The stored information on which the marking of the first protocol layer PDUs is based, in the method in the first network node, may comprise at least one of: timing information, packet size information and number of packets, of received second protocol layer PDUs of said flow.

The method in a first network node may further comprise identifying second protocol layer PDUs that are appropriate for manipulation based on the stored information, and wherein the marking of PDUs on the first protocol layer comprises marking of first protocol layer PDUs that correspond to the identified second protocol layer PDUs.

The receiving of PDUs of a flow in the method in the first network node may comprise receiving PDUs of two or more flows on the second protocol layer, wherein the extracting information comprises extracting information about said two or more flows and storing said information being extracted, and wherein the marking comprises marking PDUs on the first protocol layer, where said first protocol layer PDUs being marked correspond to second protocol layer PDUs that are appropriate for manipulation and that are from at least one of said two or more flows of second protocol layer PDUs, based on said stored information.

The marking of first protocol layer PDUs in the method on the first network node, may comprise marking of first protocol layer PDUs, corresponding to second protocol layer PDUs that are appropriate for manipulation based on a degree of priority of said second protocol layer PDUs based on said stored information.

The second protocol layer in the method in the first network node may comprise any of: IP, TCP, and User Datagram Protocol, UDP, Real-Time Control Protocol, RTCP, Datagram Congestion Control Protocol, DCCP, Stream Control Transmission Protocol, SCTP, Resource reservation Protocol, RSVP, and Explicit Congestion Notification, ECN.

The first protocol layer in the method in the first network node may comprise Radio Link Control (RLC), layer or Medium Access Control-d (MAC-d), layer.

In the method in the first network node, the first protocol layer PDUs being marked, corresponding to second protocol layer PDUs that are appropriate for manipulation, may comprise the second protocol layer PDUs that are appropriate for manipulation, as a payload.

According to another aspect of this disclosure a first network node for marking of PDUs on a first protocol layer, is disclosed. The network node comprises a first interface that is configured to receive PDUs of a flow on a second protocol layer, and a processor that is configured to extract information about said flow and to store information being extracted in a database. The first network node also comprises a marking unit that is configured to mark first protocol layer PDUs that correspond to second protocol layer PDUs that are appropriate for manipulation based on information stored in the database. In addition, the first network node also comprises a second interface that is configured to send PDUs on the first protocol layer that is lower protocol layer than said second protocol layer.

The processor within the first network node may be configured to extract information comprising at least one of: a protocol or application type of the flow, a source IP address, a destination IP address, a source port and a destination port, which all are at least associated with the flow.

The first interface of the first network bode may further be configured to receive PDUS of two or more flows on a second protocol layer, wherein the processor of the first network node may further be configured to extract information about said two or more flows and to store information being extracted in a database, and wherein the marking unit further is configured to mark first protocol layer PDUs corresponding to second protocol layer PDUs that are appropriate for manipulation and that are from at least one of said two or more flows of second protocol layer PDUs, based on information stored in the database.

The processor within the first network node may be configured to identify second protocol layer PDUs that are appropriate for manipulation based on the information stored in the database, and where the marking unit is configured to mark first protocol layer PDUs that correspond to the identified second protocol layer PDUs.

The first network node may be a RNC.

According to another aspect of this disclosure a method for manipulating PDUs on a first protocol layer in a second network node of a communication network, is disclosed. The method comprises receiving from a first network node PDUs on a first protocol layer, wherein said first protocol layer PDUs comprise marked first protocol layer PDUs that correspond to second protocol layer PDUs that are appropriate for manipulation. The method also comprises detecting a condition at least indicative of congestion in the communication network, and selecting one or more marked PDUs on the first protocol layer, based on the detected condition. In addition, the method comprises manipulating said selected PDUs.

The method in the second network node may further comprise scheduling PDUs comprising manipulated PDUs, for sending said scheduled PDUs over a radio link.

The detecting, within the method in the second network node, of a condition at least indicative of congestion may comprise detecting that one or more PDUs on the first protocol layer have not been successfully received from the first network node.

The detecting that one or more PDUs on the first protocol layer have not been successfully received from the first network node, may be based on one or more sequence numbers of received the first protocol layer PDUs.

The detecting, within the method in the second network node, of a condition at least indicative of congestion may comprise detecting a queuing delay and/or fill level of a Priority Queue to which first protocol layer PDUs are assigned before being sent over the radio link.

The detecting, within the method in the second network node, of a condition at least indicative of congestion may comprise detecting a fill level of first protocol layer PDUs of a queue in a network between said first network node and said second network node.

The detecting, within the method in the second network node, of a condition at least indicative of congestion may comprise detecting overflow in a memory for temporary storage of first protocol layer PDUs.

The selecting one or more marked first protocol layer PDUs in the method in the second network node may comprise selecting one or more marked first protocol layer PDUs being marked according to a degree of priority of said second protocol layer PDUs, for prioritized manipulation.

The manipulating said selected first protocol layer PDUs in the method in the second network node comprises corrupting payload of said selected first protocol layer PDUs or dropping said selected first protocol layer PDUs.

The receiving in the method in the second network node may comprise receiving from a first network node PDUs on a first protocol layer, wherein said first protocol layer PDUs comprise marked first protocol layer PDUs that correspond to second protocol layer PDUs that are appropriate for manipulation and that are from at least one of two or more flows of second protocol layer PDUs.

According to yet another aspect of this disclosure a second network node for manipulating PDUs, is disclosed. The second network node comprises an interface that is configured to receive PDUs on a first protocol layer, wherein the first protocol layer PDUs comprise marked first protocol layer PDUs that correspond to second protocol layer PDUs that are appropriate for manipulation. The second network node also comprises a processor configured to detect a condition at least indicative of congestion, to select one or more marked first protocol layer PDUs in response to the detected condition at least indicative of congestion; and to manipulate said selected one or more marked first protocol layer PDUs.

The second network node may further comprise a scheduler that is configured to schedule first protocol layer PDUs comprising manipulated first protocol layer PDUs, for sending said scheduled first protocol layer PDUs over a radio link.

The interface within the second network node may further be configured to receive PDUs on a first protocol layer, wherein the first protocol layer PDUs comprise marked first protocol layer PDUs that correspond to second protocol layer PDUs that are appropriate for manipulation and that are from at least one of two or more flows of second protocol layer PDUs.

The second network node may be a base station such as a node B or a Radio Base Station.

Embodiments of the present disclosure come with the following advantages:

A reduced PDU loss rate at TN congestion due to that the correct flow is affected, which quicker takes care of the congestion situation.

A reduced delay at Uu congestion due to that the correct flow is affected, which takes care of the congestion situation.

An improved end user experience as the disclosure can avoid that inappropriate PDUs are discarded, which else would inappropriately affect the user performance.

An additional advantage of the present disclosure is that information about which flow to affect in a multi-flow scenario is provided, by the use of which the intended effect of a PDU discard functionality is achieved

BRIEF DESCRIPTION OF DRAWINGS

These and other aspects, features and advantages of which this disclosure is capable of, will be apparent and elucidated from the following description of embodiments of this disclosure, reference being made to the accompanying drawings, in which FIG. 1 schematically illustrates a communication network in which concepts of congestion handling according to embodiments of the present disclosure, are applied;

FIGS. 4-7 illustrate flowcharts of methods according to embodiments of the present disclosure.

ABBREVIATIONS

ACK Acknowledgement
CN Core Network
DCCP Datagram Congestion Control Protocol
ECN Explicit Congestion Notification
IP Internet Protocol
MAC-d Medium Access Control-d
NB Node B
PDU Protocol Data Unit
RBS Radio Base Station
RLC Radio Link Control
RNC Radio Network Controller
RSVP Resource reservation Protocol
RTCP Real-Time Control Protocol
SCTP Stream Control Transmission Protocol
SDU Service Data Units
TN Transport Network
UDP User Datagram Protocol
UE User Equipment

DETAILED DESCRIPTION

According to a basic concept of this disclosure, manipulation of Protocol Data Units (PDUs) on a first protocol layer is made based on information available and accessible on a second protocol layer. By marking PDUs on the first protocol layer based on information available on the second protocol layer, manipulation of PDUs on the first protocol layer is enabled by the base station.

It is emphasized that the information available and accessible on the second protocol layer is per se not accessible on the first layer. In order to identify PDUs on the first protocol layer which correspond to the PDUs on the second protocol layer which are appropriate for manipulation, PDU on the first protocol layer are marked.

The present disclosure improves discarding of PDUs by using information about user data such as application, protocol type as well as other PDU information.

A more detailed description of the present disclosure is presented below.

FIG. 1 illustrates a communication network 100 in which concepts of the present disclosure are applied.

The communication network 100 comprises a Core Network (CN) 101, a Radio Network Controller (RNC) 102, a Transport Network (TN) 104, a Node B (NB) 106 and a User Equipment (UE) 108. The RNC 102 comprises a buffer 103 capable to buffer data packets or PDUs. The TN 104 and the NB 106 each comprises a buffer 105, and 107, for buffering of PDUs.

Packet data units of a flow on one protocol layer are received from the CN 101 by the RNC 102. PDUs on another protocol layer are sent over the Iub interface via the TN 104 to the NB 106. The NB then provides PDU to the UE 108 over the Uu interface.

Figure 2:
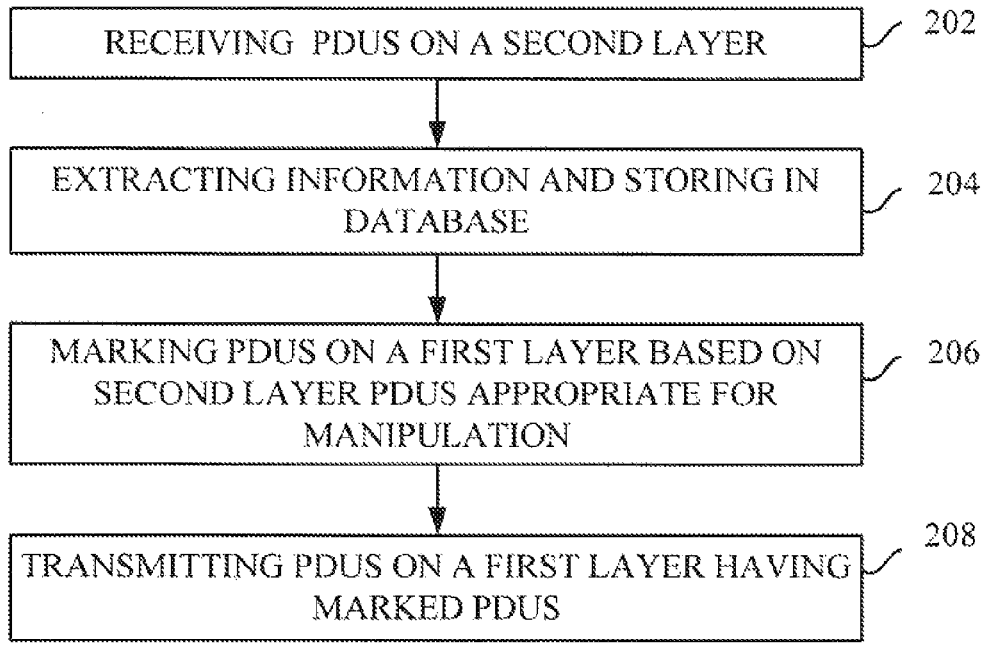
FIGS. 2 and 3 schematically illustrate network nodes according to some embodiments of the present disclosure.

FIG. 2 illustrates a flowchart of a method for marking PDUs on a first protocol layer in a first network node of a communication network, according to some embodiments of the present disclosure.

The flowchart comprises receiving 202 PDUs of a flow on a second protocol layer, and extracting 204 information about said flow and storing said information being extracted. The flowchart further comprises marking 206 PDUs on the first protocol layer, where said first protocol layer PDUs that are being marked correspond to second protocol layer PDUs that are appropriate for manipulation based on said stored information. In addition, the flowchart comprises sending 208 PDUs on the first protocol layer that is a lower protocol layer than said second protocol layer.

It is mentioned that the method for marking PDUs on a first protocol layer in a first network node of a communication network, may comprise receiving 202 PDUs of two or more flows on a second protocol layer. An application may thus use more than one single flow of PDUs, for example two or more flows. The more flows are used for the application the higher the bandwidth for the application.

If for instance two flows are used by a single application, such as when downloading from a webpage, PDUs on a second protocol layer from these two flows are received. First protocol layer PDUs that correspond to second protocol layer PDUs from one or two of said flows for which said second protocol layer PDUs are appropriate for manipulation based on said stored information, are then marked.

Figure 3:
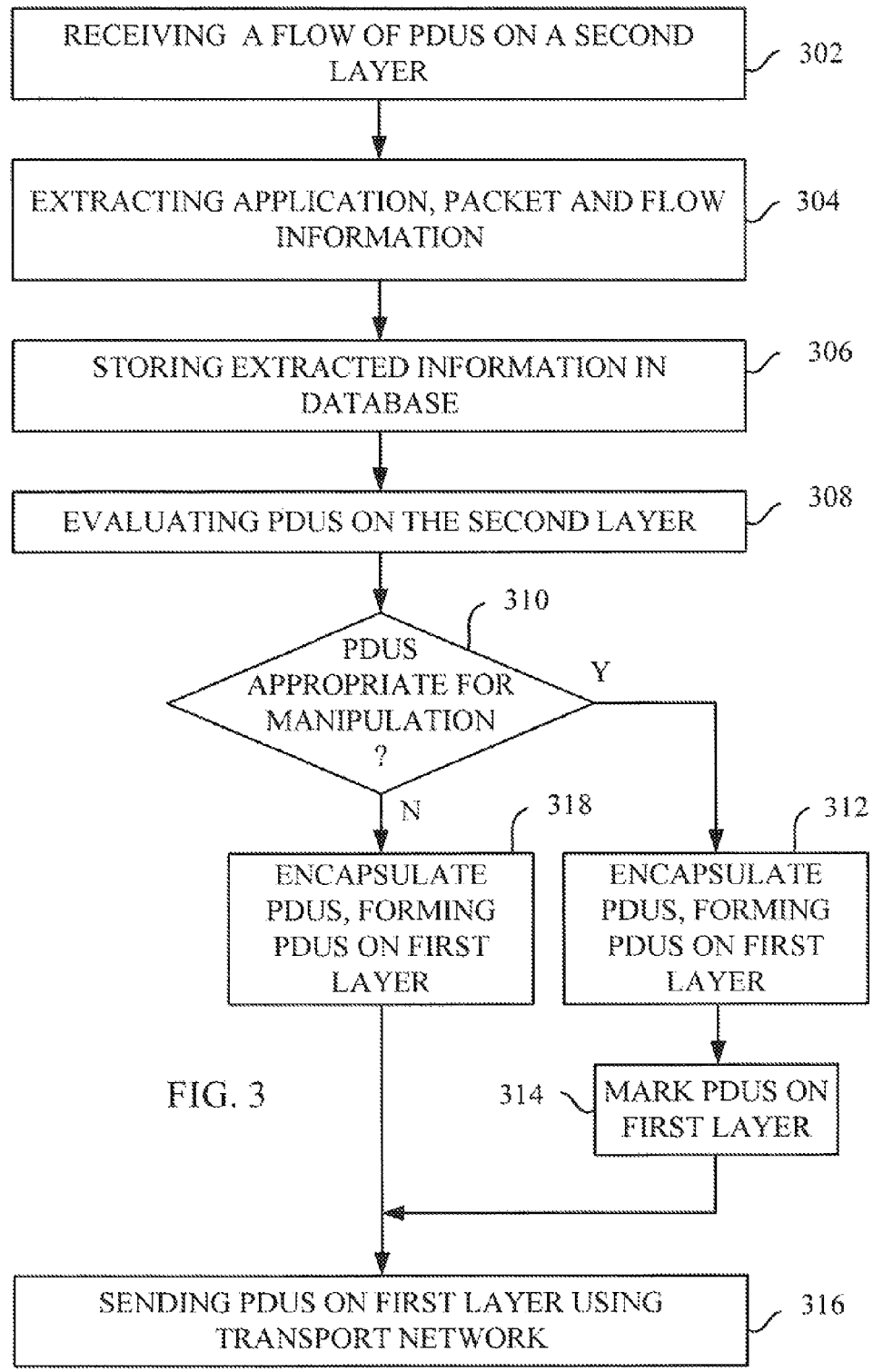

FIG. 3 illustrates a flowchart of a method for marking PDUs in a first network node of a communication network, according to some embodiments of the present disclosure.

This flowchart comprises receiving 302 a flow of PDUs on a second protocol layer. The flowchart further comprises extracting 304 information about the application or protocol of the flow, information of the PDUs and information about the flow. Information about the PDUs may comprise timing information of the PDUs, for instance time of arrival of the PDUs to the first network node.

Information extracted may comprise the bit-rate of the flow, the service or application of the flow, header information of the flow and PDU information, for each different flow.

The flow information may comprise at least one piece of information present in the 5-tuple defining the flow, i.e. at least one of: a protocol or application type of the flow, a source IP address, a destination IP address, a source port and a destination port, which all are at least associated with the flow.

It should be mentioned that flows of PDUs may exist on different layers. A flow may be defined by the 5-tuple comprising the protocol type of the flow, needless to say among other parameters. A flow on another layer may be defined by a 5-tuple comprising the application type responsible for the flow, in addition to a source IP address, a destination IP address, a source port and a destination port, which all are at least associated with the flow. The method also comprises storing 306 said extracted information in a database.

Data from the CN typically comprises a plurality of flows. As information from each flow is stored in the database, the database accumulates information from a plurality of flows.

The method further comprises evaluating 308 PDUs on the second protocol layer, i.e. the protocol layer on which the PDUs arrived to the first network node.

It is then determined 310 whether PDUs on the second protocol layer are appropriate for manipulation. It is thus determined which PDUs on the second protocol layer are appropriate for manipulation. One criterion for being appropriate for manipulation may be that the bit-rate of the flow of said PDUs exceeds a certain bit-rate threshold.

One example of the second protocol is TCP. Another example of the second protocol is UDP. The PDUs of the second protocol layer, may alternatively comprise IP PDUs or IP packets. For instance, it may be preferred to manipulate PDUs of a TCP flow with a highest bit-rate.

In the case of multiple flows of second protocol layer PDUs it may be determined 310 which PDUs among the PDUs on two or more flows are appropriate for manipulation. Some PDUs from a first flow and some PDUs from a second flow may be thus determined to be appropriate for manipulation.

If the PDUs of the second protocol layer are determined to be appropriate for manipulation, the PDUs on the second protocol layer are then encapsulated 312 forming PDUs on the first protocol layer. The flowchart then comprises marking 314 of these first protocol layer PDUs.

The marking of PDUs of the first protocol layer is thus performed to provide information to a second network node, such as a base station, about which first protocol layer PDUs may later be manipulated without negatively affecting incorrect PDUs.

It is be added that PDUs to be avoided as candidates for marking may comprise:

TCP ACKs since manipulation or discard has no effect since the corresponding data to which the ACK refers will be retransmitted due to the transmission protocol used over the transport network being a persistent protocol;

UDP PDUs with data traffic;

PDUs in a low traffic flow as manipulation of such a flow has no or limited effect on the bit-rate of other flows;

PDUs being crucial for the end user experience, such as chat messages, connection establishments or requests etc, as these would have an unintentionally large impact to the user experience if affected.

Some PDUs may be more appropriate for manipulation than others. By differently marking first protocol layer PDUs, according to the appropriateness of the corresponding second protocol layer PDUs to be manipulated, a prioritized manipulation is enabled based on the information stored in the database.

The marking of first protocol layer PDUs may also be performed in order to enable avoiding reduced end user performance/experience. For this purpose PDUs important to the end user experience may be marked such that the base station avoids manipulating said PDUs. Needless to say, this can be performed in various ways.

Special marking of important and/or crucial PDUs may be configured by an operator and be associated with the application of the flow.

Having marked the first protocol layer PDUs, PDUs comprising the marked first protocol layer PDUs are then sent 316 over a transport network to a second network node.

If the second protocol layer PDUs are not appropriate for manipulation in 310, these are encapsulated 318 forming first protocol layer PDUs before said first protocol layer PDUs are sent 316 to over the transport network.

The PDUs that are sent over the transport network are thus both marked first protocol layer PDUs and first protocol layer PDUs that are not marked.

The second protocol layer may be any of: Internet Protocol, IP, Transmission Control Protocol, TCP, User Datagram Protocol, UDP, Real-Time Control Protocol, RTCP, Datagram Congestion Control Protocol, DCCP, Stream Control Transmission Protocol, SCTP, Resource reservation Protocol, RSVP, Real Time Protocol, RTP, and Explicit Congestion Notification, ECN.

The second protocol layer may comprise any protocol on layer 4 or above of the Open Systems Interconnection 7-level stack, well known to the artisan.

The second protocol layer may comprise any protocol on layer 4 or 5 of the IP layer stack, wherein layer 4 and 5 correspond to transport and application layer, respectively.

The first protocol layer may be the Radio Link Control (RLC) layer or the Medium Access Control (MAC)-d layer.

Figure 4:
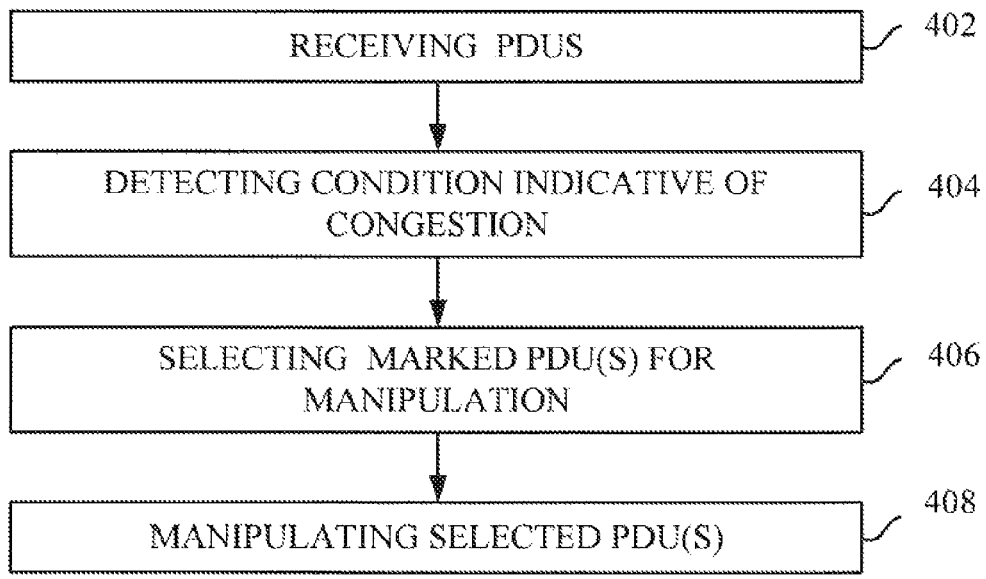

Reference will now be made to FIG. 4 presenting a flowchart of a method for manipulating PDUs on a first protocol layer in a second network node of the communication network.

According to embodiments of the present disclosure the method comprises receiving 402 from a first network node 102 PDUs on a first protocol layer, wherein said first protocol layer PDUs comprise marked first protocol layer PDUs that correspond to second protocol layer PDUs that are appropriate for manipulation.

The method also comprises detecting 404 a condition at least indicative of congestion in the communication network, and selecting 406 one or more marked PDUs on the first protocol layer, based on the detected condition. In addition, the method comprises manipulating 408 said selected PDUs.

Figure 5:
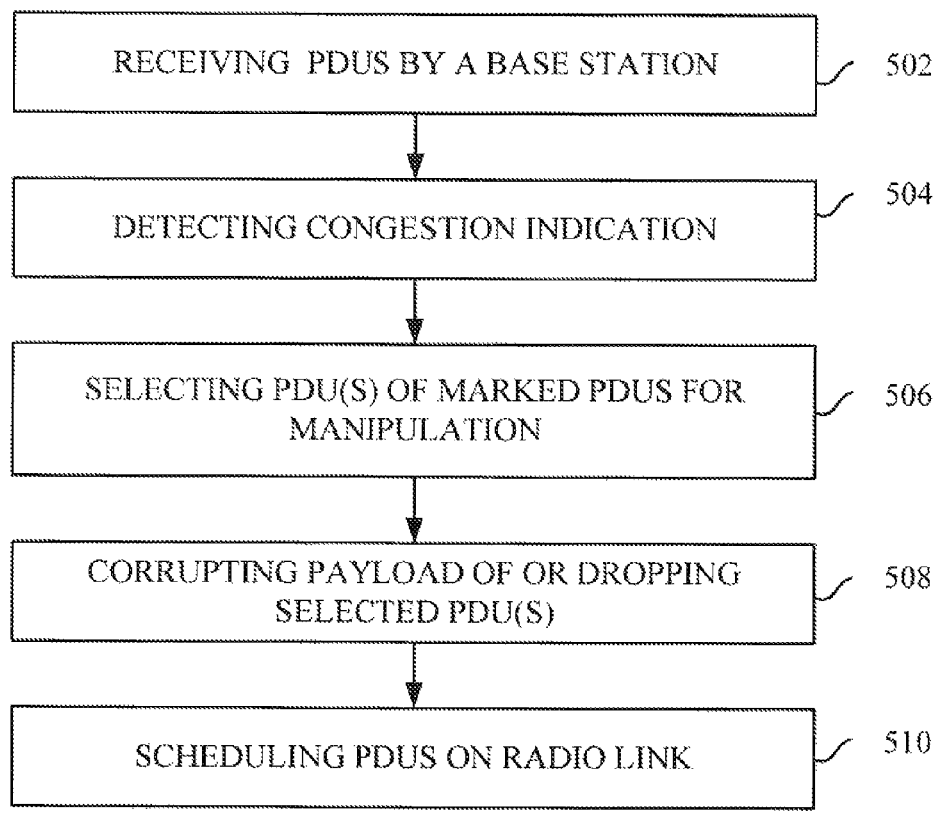

FIG. 5 illustrates a flowchart of a method for manipulating PDUs on a first protocol layer in a base station, being on example of the second network node, of the communication network. This method comprises receiving 502 PDUs by the base station.

Receiving 502 may comprise receiving from a first network node 102 PDUs on a first protocol layer, wherein said first protocol layer PDUs comprise marked first protocol layer PDUs that correspond to second protocol layer PDUs of at least one of two or more flows which are appropriate for manipulation.

The method also comprises detecting 504 a condition at least indicative of congestion in the communication network.

Detecting 504 a condition at least indicative of congestion may comprise detecting that one or more PDUs on the first protocol layer have not been successfully received from a RNC. This may be based on the sequence number of one or more PDUs received by the base station. For instance, in case the base station receives PDUs having sequence numbers "N" and "N+2", but not the PDU having sequence number "N+1", the base station has detected a condition indicative of congestion. The absence of the PDU having sequence number "N+1" may be due to a PDU drop or discard caused by congestion in the TN.

Detecting 504 a condition at least indicative of congestion may comprise detecting a fill level of first protocol layer PDUs of a queue in the transport network between the RNC and the base station. For instance if the fill level of a queue 105 in the TN 104, both of FIG. 1, exceeds a given threshold value, this is indicative of a congestion.

Detecting 504 a condition at least indicative of congestion may alternatively comprise detecting a queuing delay and/or fill level of a Priority Queue or buffer 107, of FIG. 1, in the base station to which first protocol layer PDUs are assigned before being sent over a radio link to a UE. If the queuing delay for instance increases above a certain threshold, of if the fill level increases above another threshold, this means that the Uu interface between the base station and the UE is congested.

Detecting 504 a condition at least indicative of congestion may alternatively comprise detecting that PDUs queued in the Priority Queue of buffer 107 are older than a certain age, for instance a number of milliseconds. Detecting 504 a condition at least indicative of congestion may alternatively comprise detecting overflow in a memory for temporary storage of first protocol layer PDUs in the base station. The memory for temporary storage may be completely filled for which reason PDUs may have to be discarded. PDUs being completely discarded will however be retransmitted, as compared to PDUs the payload of which is manipulated. This is due to the first protocol layer being a retransmission protocol.

The method for manipulation of first protocol PDUs in the base station also comprises selecting 506 one or more marked first protocol layer PDUs that correspond to second protocol layer PDUs that are appropriate for manipulation. Selecting one or more first protocol layer PDUs is based on the detected condition indicative of congestion. Selecting one or more first protocol layer PDUs may be based on the nature of the detected condition indicative of congestion. For instance, if the detected condition indicates a severe congestion, more than one PDU may be selected for manipulation.

PDUs may also be selected on multiple flows at a condition indicating severe congestion or for users with a large amount of flows, as for instance P2P file sharing. If the receiving from a first network node PDUs on a first protocol layer comprises receiving differentially marked PDUs on the first protocol layer, a prioritized manipulation of the received first protocol layer is enabled in the second network node. This may be performed by selecting first protocol layer PDUs according to the differentially marked first protocol layer PDUs. A first marking may correspond to being most appropriate to be manipulated. A second and third marking may correspond to being second and third, respectively, most appropriate to be manipulated.

The kind of marks or marking of first protocol layer PDUs may here depend on the extent of appropriateness of PDUs on the second protocol layer to which the first protocol layer PDUs corresponds.

Highly prioritized PDUs will typically have a low appropriateness to be manipulated, whereas PDUs of lower priority will typically be more appropriate to be manipulated.

Again, when selecting PDUs on the first protocol layer information about the flow and its PDUs on the second protocol layer is not accessible. The PDUs on the first protocol layer comprises the PDUs on the second protocol layer as a payload.

In addition, the payload of the PDU on the first protocol layer is typically encrypted, which hinders a base station to extract information about the PDU.

For example, the 5-tuple is not accessible on the first protocol layer.

Hence, PDUs on the first protocol layer are marked based on information available on the first protocol layer, according to embodiment of the present disclosure.

The method may then comprise corrupting 508 the payload of the selected first protocol layer PDU(s), i.e. corrupting the Service Data Unit, SDU on the first protocol layer. It is mentioned that the SDU on the first protocol layer corresponds to and even is the PDU of the second protocol layer, when the first protocol layer is a lower layer than the second protocol layer.

The method may alternatively comprise dropping or discarding 508 the selected first protocol PDUs.

Corruption or discard on a flow different from another flow for instance within a certain time interval from the time at which a PDU was last corrupted or discarded is enabled. This is advantages since subsequent discards from the same flow within a certain time interval from the time at which a PDU was last corrupted or discarded, has no effect. This is due to that PDU discard or loss is ignored within a roundtrip time from a congestion window reduction, as the first PDU loss has not taken effect yet. The method may also comprise scheduling 510 the first protocol PDUs after the manipulation on the radio link to the UE 108.

It should be mentioned that manipulation of PDUs on the first protocol layer in the base station may cause a destination point of a network node on a second protocol layer to discard PDUs on said second protocol layer. For instance a UE or a personal computer based dongle, hosting the destination point, may thus discard TCP PDUs, i.e. IP packets. The fact that one or more IP packets are discarded is signaled back to a TCP server hosting the source, which TCP server then decreases the bit-rate of the flow that reached the first network node. By reducing the bit-rate of the TCP flow, the RNC is received by a TCP flow having a reduced bit-rate. This decreases the risk of detecting a congestion triggering manipulation of one or more PDUs in the base station.

FIG. 6 schematically presents a network node 600 for marking of PDUs on a first protocol layer. The network node 600 comprises a first interface 602 that is configured to receive 202, 302 PDUs of a flow on a second protocol layer. The network node 600 also comprises a processor 604 that is configured to extract 204, 304 information about said flow and to store information being extracted in a database. The network node 600 also comprises a marking unit 606 that is configured to mark 206, 314 first protocol layer PDUs that correspond to second protocol layer PDUs that are appropriate for manipulation based on information stored in the database. In addition, the network node 600 comprises a second interface 608 that is configured to send 208, 316 PDUs on the first protocol layer that is lower protocol layer than said second protocol layer.

The processor 604 may be configured to extract 204, 304 information comprising at least one of: a protocol type of the flow, a source IP address, a destination IP address, a source port and a destination port, which all are at least associated with the flow.

The processor 604 may further be configured to identify second protocol layer PDUs that are appropriate for manipulation based on the information stored in the database, and where the marking unit 606 also is configured to mark first protocol layer PDUs that correspond to the identified second protocol layer PDUs.

The network node 600 may be realized by a RNC.

FIG. 7 schematically presents a network node 700 for manipulating of PDUs on a first protocol layer. The network node 700 comprises an interface 702 that is configured to receive 402, 502 PDUs on a first protocol layer, wherein the first protocol layer PDUs comprise marked first protocol layer PDUs that correspond to second protocol layer PDUs that are appropriate for manipulation. The network node 700 also comprises a processor 704 that is configured to detect 404, 504 a condition at least indicative of congestion. The processor 704 is also configured to select 406, 506 one or more marked first protocol layer PDUs in response to the detected condition at least indicative of congestion. The processor 704 is also configured to manipulate 408, 508 said selected one or more marked first protocol layer PDUs.

The second network node 700 may further comprise a scheduler that is configured to schedule 510 first protocol layer PDUs comprising manipulated first protocol layer PDUs, together with non-manipulated first protocol layer PDUs, for sending scheduled first protocol layer PDUs over a radio link to a User Equipment, UE.

The processor 704 configured to detect a condition at least indicative of congestion may comprise detecting overflow in a memory comprised in the second network node 700. This memory may be configured to temporary store first protocol layer PDUs.

The second network node 700 may be realized by a base station such as a node B or a Radio Base Station.

Embodiments of the present disclosure come with the following advantages:

A reduced PDU loss rate at TN congestion due to that the correct flow is affected, which quicker takes care of the congestion situation.

A reduced delay at Uu congestion due to that the correct flow is affected, which takes care of the congestion situation.

An improved end user experience as the disclosure can avoid that inappropriate PDUs are discarded, which else would inappropriately affect the performance.

An additional advantage of the present disclosure is that information about which flow to affect in a multi-flow scenario is provided, by the use of which the intended effect of a PDU discard functionality is achieved.

It must be emphasized that this disclosure may be varied in many ways.

The elements of an embodiment of this disclosure may be physically, functionally and logically implemented in any suitable way. Indeed, the functionality may be implemented in a single unit, in a plurality of units or as part of other functional units. As such, this disclosure may be implemented in a single unit, or may be physically and functionally distributed between different units and processors.

Moreover, even though the embodiments of this disclosure are primarily described in the form of methods and network nodes, they may at least partly be embodied in a computer program product, as well as in a system comprising a computer processor and a memory coupled to the computer processor, wherein the memory is encoded with one or more computer programs for performing at least a part of the methods described herein.

It is made clear that presented embodiments may well be combined forming new embodiments not explicitly described herein.

In the claims, the term "comprises/comprising" does not exclude the presence of other elements or steps. Additionally, although individual features may be included in separate claims, these may be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

Although this disclosure has been described above with reference to (a) specific embodiment(s), it is not intended to be limited to the specific form set forth herein. Rather, this disclosure is limited only by the accompanying claims and, other embodiments than the specific above are equally possible within the scope of these appended claims.

The invention claimed is:

1. A method in a first network node of a communication network, for marking of Protocol Data Units, PDUs on a first protocol layer, the method comprising:
   receiving PDUs of two or more flows on a second protocol layer;
   encapsulating the PDUs of the second protocol layer to form PDUs of the first protocol layer;
   extracting information about said two or more flows and storing said information being extracted;
   marking PDUs on the first protocol layer, where said first protocol layer PDUs being marked correspond to second protocol layer PDUs that are appropriate for manipulation and that are from at least one of said two or more flows of second protocol layer PDUs, based on said stored information; and
   sending PDUs on the first protocol layer that is a lower protocol layer than said second protocol layer.

2. The method in a first network node according to claim 1, wherein the information about said flow, in the extracting information comprises at least one of: a protocol or application type of the flow, a source IP address, a destination IP address, a source port and a destination port, which all are at least associated with the flow.

3. The method in a first network node according to claim 1, wherein the stored information on which the marking of the first protocol layer PDUs is based, comprises at least one of: timing information, packet size information and number of packets, of received second protocol layer PDUs of said flow.

4. The method in a first network node according to claim 1, further comprising identifying second protocol layer PDUs that are appropriate for manipulation based on the stored information, and wherein the marking of PDUs on the first protocol layer comprises marking of first protocol layer PDUs that correspond to the identified second protocol layer PDUs.

5. The method in a first network node according to claim 1, wherein the marking of first protocol layer PDUs comprises marking of first protocol layer PDUs, corresponding to second protocol layer PDUs that are appropriate for manipulation, based on a degree of priority of said second protocol layer PDUs, based on said stored information.

6. The method in a first network node according to claim 1, wherein the second protocol layer comprises any of: Internet Protocol, IP, Transmission Control Protocol, TCP, User Datagram Protocol, UDP, Real-Time Control Protocol, RTCP, Datagram Congestion Control Protocol, DCCP, Stream Control Transmission Protocol, SCTP, Resource reservation Protocol, RSVP, and Explicit Congestion Notification, ECN.

7. The method in a first network node according to claim 1, wherein the first protocol layer comprises Radio Link Control, RLC, layer or Medium Access Control-d, MAC-d, layer.

8. The method in a first network node according to claim 1, where the first protocol layer PDUs being marked, corresponding to second protocol layer PDUs that are appropriate for manipulation, comprises the second protocol layer PDUs that are appropriate for manipulation, as a payload.

9. A first network node for marking of PDUs on a first protocol layer, the network node comprising:
   a first interface configured to receive PDUs of two or more flows on a second protocol layer;
   a processor configured to encapsulate the PDUs of the second protocol layer to form PDUs of the first protocol layer and to extract information about said two or more flows and to store information being extracted in a database;

a marking unit configured to mark first protocol layer PDUs that correspond to second protocol layer PDUs that are appropriate for manipulation and that are from at least one of said two or more flows of second protocol layer PDUs, based on information stored in the database; and a second interface configured to send PDUs on the first protocol layer that is lower protocol layer than said second protocol layer.

10. The first network node according to claim 9, wherein the processor further is configured to extract information comprising at least one of: a protocol or application type of the flow, a source IP address, a destination IP address, a source port and a destination port, which all are at least associated with the flow.

11. The first network node according to claim 9, wherein the processor further is configured to identify second protocol layer PDUs that are appropriate for manipulation based on the information stored in the database, and where the marking unit is configured to mark first protocol layer PDUs that correspond to the identified second protocol layer PDUs.

12. A method for manipulating PDUs on a first protocol layer in a second network node of a communication network, the method comprising:

receiving from a first network node PDUs on a first protocol layer that encapsulate PDUs on a second protocol layer, wherein said first protocol layer PDUs comprise marked first protocol layer PDUs that correspond to second protocol layer PDUs that are appropriate for manipulation and that are from at least one of two or more flows of second protocol layer PDUs;

detecting a condition at least indicative of congestion in the communication network, selecting one or more marked PDUs on the first protocol layer, based on the detected condition; and manipulating said selected PDUs.

13. The method according to claim 12, further comprising scheduling PDUs comprising manipulated PDUs, for sending said scheduled PDUs over a radio link.

14. The method according to claim 12, wherein the selecting one or more marked first protocol layer PDUs comprises selecting one or more marked first protocol layer PDUs being marked according to a degree of priority of said second protocol layer PDUs, for prioritized manipulation.

15. The method according to claim 12, wherein the manipulating said selected first protocol layer PDUs comprises corrupting payload of said selected first protocol layer PDUs or dropping said selected first protocol layer PDUs.

16. A second network node for manipulating PDUs, the second network node comprising:

an interface configured to receive PDUs on a first protocol layer that encapsulate PDUs on a second protocol layer, wherein the first protocol layer PDUs comprise marked first protocol layer PDUs that correspond to second protocol layer PDUs that are appropriate for manipulation and that are from at least one of two or more flows of second protocol layer PDUs;

a processor configured to detect a condition at least indicative of congestion, to select one or more marked first protocol layer PDUs in response to the detected condition at least indicative of congestion; and to manipulate said selected one or more marked first protocol layer PDUs.

17. The second network node according to claim 16, further comprising a scheduler configured to schedule first protocol layer PDUs comprising manipulated first protocol layer PDUs, for sending said scheduled first protocol layer PDUs over a radio link.

* * * * *